United States Patent
Sherrick et al.

(10) Patent No.: US 12,179,552 B2
(45) Date of Patent: Dec. 31, 2024

(54) AUXILIARY VEHICLE HVAC POWER SYSTEMS AND METHODS

(71) Applicant: Illinois Tool Works Inc., Glenview, IL (US)

(72) Inventors: Matthew John Sherrick, Neenah, WI (US); Michael John Trinkner, Kaukauna, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 16/918,777

(22) Filed: Jul. 1, 2020

(65) Prior Publication Data

US 2021/0031590 A1 Feb. 4, 2021

Related U.S. Application Data

(60) Provisional application No. 62/880,384, filed on Jul. 30, 2019.

(51) Int. Cl.
*B60H 1/00* (2006.01)
*B60K 25/02* (2006.01)
(Continued)

(52) U.S. Cl.
CPC ..... *B60H 1/00428* (2013.01); *B60H 1/00735* (2013.01); *B60H 1/00899* (2013.01);
(Continued)

(58) Field of Classification Search
CPC ............ B60H 1/00428; B60H 1/00735; B60H 1/00899; B60H 1/00007; B60H 1/00642;
(Continued)

(56) References Cited

U.S. PATENT DOCUMENTS

| 4,825,663 A | 5/1989 | Nijjar |
| 6,199,387 B1 * | 3/2001 | Sauterleute ............ B64D 13/06 62/87 |

(Continued)

FOREIGN PATENT DOCUMENTS

| CA | 2396143 | 7/2003 |
| CN | 101331369 | 12/2008 |

(Continued)

OTHER PUBLICATIONS

European Office Communication Appln No. 20186422.0 dated Dec. 17, 2020.
European Office Communication Appln No. 20186422.0 dated Dec. 21, 2021.

*Primary Examiner* — Jung Kim
(74) *Attorney, Agent, or Firm* — McAndrews, Held & Malloy, Ltd.

(57) ABSTRACT

Systems and methods are disclosed for providing a work vehicle with an auxiliary air conditioner and/or an auxiliary heater. The systems include power conversion circuitry configured to convert AC power from an AC power source to power conditioned to drive the auxiliary air conditioner and/or auxiliary heater. The AC power source may be configured to drive various loads, and accordingly may include control circuitry to manage the power provided to the various loads, including the auxiliary air conditioner and/or auxiliary heater.

19 Claims, 5 Drawing Sheets

(51) Int. Cl.
    *B60R 16/03*           (2006.01)
    *B60R 16/033*        (2006.01)
    *H02J 7/14*            (2006.01)

(52) U.S. Cl.
    CPC .......... *B60K 25/02* (2013.01); *B60R 16/0307* (2013.01); *B60R 16/033* (2013.01); *H02J 7/14* (2013.01)

(58) Field of Classification Search
    CPC .... B60H 1/3204; B60H 1/3205; B60K 25/02; B60R 16/0307; B60R 16/033; H02J 7/14; Y02T 10/88
    See application file for complete search history.

(56) References Cited

U.S. PATENT DOCUMENTS

| | | | |
|---|---|---|---|
| 10,618,426 | B2 | 4/2020 | Lee |
| 2006/0055378 | A1* | 3/2006 | Bauerle ..................... H02J 7/14 322/28 |
| 2006/0124275 | A1 | 6/2006 | Gosse |
| 2010/0102625 | A1* | 4/2010 | Karimi ................... B60L 50/30 307/9.1 |
| 2019/0184838 | A1 | 6/2019 | Lee |

FOREIGN PATENT DOCUMENTS

| | | |
|---|---|---|
| CN | 201824833 | 5/2011 |
| CN | 102144344 | 8/2011 |
| CN | 102941792 | 2/2013 |
| CN | 103502751 | 1/2014 |
| CN | 106351755 | 1/2017 |
| CN | 107571712 | 1/2018 |
| CN | 207128546 | 3/2018 |
| CN | 109476211 | 3/2019 |
| CN | 109641728 | 4/2019 |
| JP | 2010105586 | 5/2010 |
| WO | 2007084131 | 7/2007 |
| WO | 2012138500 | 10/2012 |
| WO | 2018009798 | 1/2018 |
| WO | 2018044859 | 3/2018 |

* cited by examiner

AUXILIARY VEHICLE HVAC POWER SYSTEMS AND METHODS

CROSS REFERENCE TO RELATED APPLICATIONS

The present application claims the benefit of U.S. Provisional Patent Application Ser. No. 62/880,384 filed Jul. 30, 2019, entitled "Auxiliary Vehicle HVAC Power Systems and Methods." The entire contents of U.S. Provisional Patent Application Ser. No. 62/880,384 are expressly incorporated herein by reference.

BACKGROUND

The present disclosure relates to heating and air conditioning systems for work vehicle cabs, and more particularly to power systems for heating and/or air conditioning systems for work vehicles.

Conventionally, vehicles are cooled by air conditioning systems integrated into the vehicle dash and chassis and powered by the vehicle engine. Conventionally vehicles are also heated by heating systems integrated into the vehicle dash and chassis and powered by the vehicle engine. Various auxiliary air conditioning and heating systems may also be used to cool and/or heat vehicle cabs, especially when a vehicle is stationary.

SUMMARY

A power supply to convert received alternating current ("AC") power to direct current ("DC") power to power an auxiliary air conditioner to cool a vehicle, substantially as illustrated by and described in connection with at least one of the figures.

BRIEF DESCRIPTION OF THE DRAWINGS

The figures are not necessarily to scale. Where appropriate, similar or identical reference numbers are used to refer to similar or identical components.

DETAILED DESCRIPTION

Figure 1:
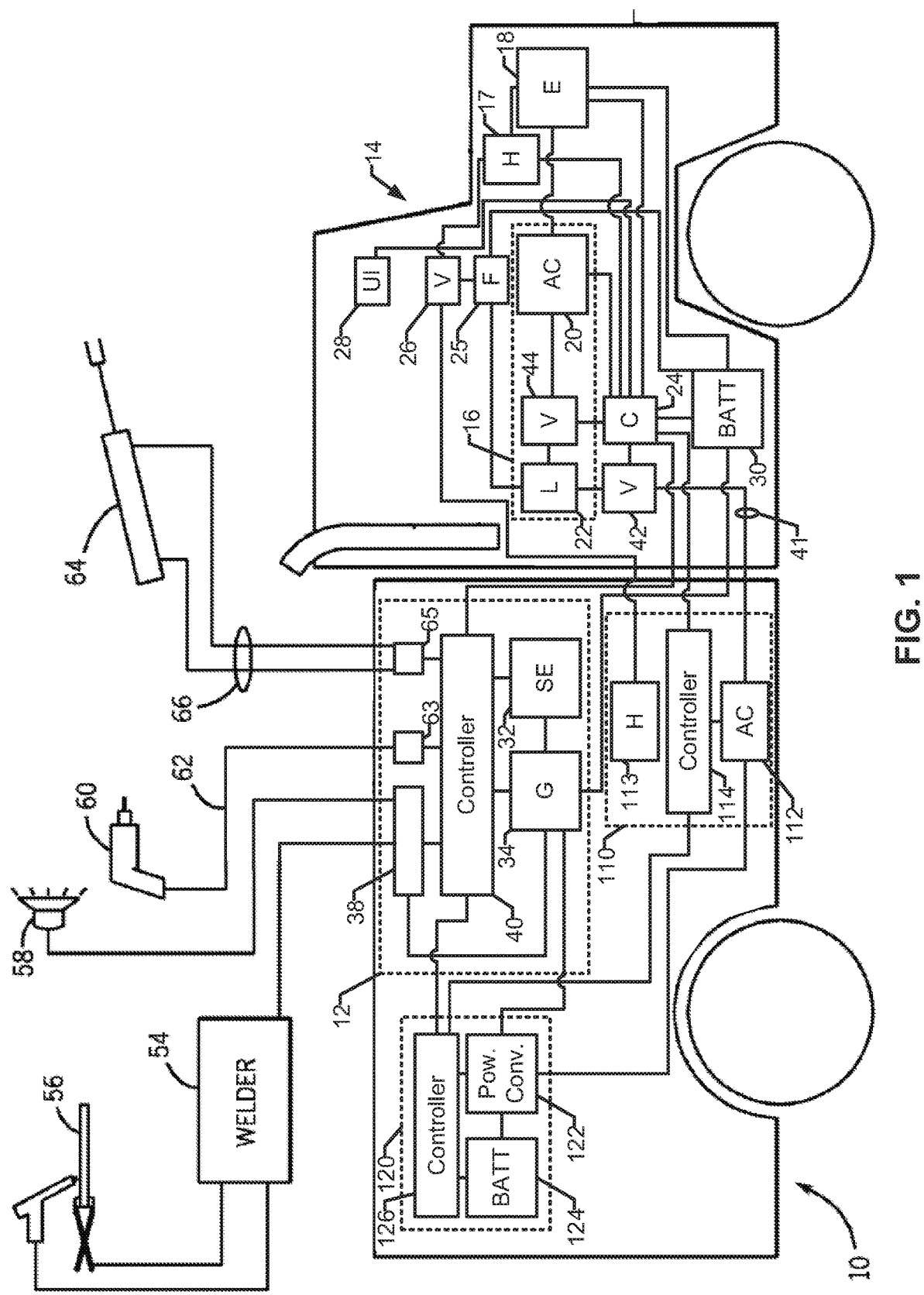
FIG. 1 is a diagrammatic overview of a work vehicle and an installed service pack, in accordance with aspects of this disclosure.

Conventional vehicle cabs are cooled by air conditioning systems integrated into the vehicle dash and chassis and powered by the vehicle engine. If the cab is to be cooled without the vehicle engine running, a separate air conditioning system is put on the vehicle (e.g., a service truck). Conventional vehicle cabs are also similarly heated by heating systems integrated into the vehicle dash and chassis and powered by the vehicle engine. Similarly, if the cab is to be heated without the vehicle engine running, a separate heating unit is put on the vehicle. Powering the integrated air conditioning system and/or the integrated heating system with the vehicle engine may be inefficient in some situations, and therefore a separate auxiliary air conditioning system and/or a separate auxiliary heating system (e.g., a heating-ventilation-air-conditioning, or HVAC, system) that are powered by a more efficient source may be desirable.

The separate air conditioning systems may be electrically powered by the vehicle batteries or a separate power source (e.g., a solar power system). Separate AC systems may require a refrigeration (or coolant) loop separate from the vehicle's refrigeration loop, and thus separate air conditioning systems may duplicate components and systems. Similarly, a separate heating system may also be electrically powered by the vehicle batteries or a separate power source and may duplicate components and systems of the vehicle's integrated heating system.

Some service trucks include a service pack mounted onto the truck. A service pack includes an auxiliary engine (a service engine) and a generator which provides alternating current ("AC") power. The present disclosure relates to a system which powers an auxiliary air conditioning system for a vehicle via received AC power, for example AC power received from a generator of a vehicle mounted service pack. The present disclosure also relates to a system which powers an auxiliary heating system for a vehicle via the received AC power.

Disclosed example systems configured to power an auxiliary air conditioner of a vehicle include: an engine mounted on the vehicle; a generator mounted on the vehicle and configured to convert mechanical power produced by the engine to AC power; a converter circuit configured to convert the AC power to DC power to power the auxiliary air conditioner; and control circuitry configured to: determine a first power demand from the auxiliary air conditioner; and control an amount of power supplied by the converter circuit to the auxiliary air conditioner based in part on the first power demand.

In some example systems configured to power an auxiliary air conditioner of a vehicle, the control circuitry is configured to control the converter circuit to convert AC power from the generator to charge the battery.

In some example systems configured to power an auxiliary air conditioner of a vehicle, the control circuitry is configured to control the converter circuit to charge the battery if the first power demand is less than a threshold power demand.

In some example systems configured to power an auxiliary air conditioner of a vehicle, the control circuitry is configured to control the battery to supply power to the auxiliary air conditioner if the first power demand satisfies a threshold power demand.

In some example systems configured to power an auxiliary air conditioner of a vehicle, the control circuitry is configured to: determine an amount of power available from the generator; and control the battery to supply power to the auxiliary air conditioner if the amount of power available from the generator is less than the first power demand.

In some example systems configured to power an auxiliary air conditioner of a vehicle, the generator is configured to charge a battery of the vehicle.

In some example systems configured to power an auxiliary air conditioner of a vehicle, the AC power is one of 120 Volts or 240 Volts.

Disclosed example auxiliary air conditioning systems for a vehicle include: a converter circuit configured to convert received AC power to DC power; a compressor driven by the DC power supplied by the converter circuit; and control circuitry configured to: determine a first power demand based on a temperature setting for the vehicle; and control an amount of power supplied by the converter circuit to the compressor based on the first power demand.

In some example auxiliary air conditioning systems for a vehicle, the temperature setting is input at a user interface of the vehicle.

In some example auxiliary air conditioning systems for a vehicle, the compressor is configured to pump refrigerant through a refrigeration loop integral to the vehicle.

Some example auxiliary air conditioning systems for a vehicle include a fan configured to blow over a condenser of the refrigeration loop.

In some example auxiliary air conditioning systems for a vehicle, the fan is powered by the converter circuit.

Some example auxiliary air conditioning systems for a vehicle include a battery, and the control circuitry is configured to control the converter circuit to charge the battery. In some example auxiliary air conditioning systems for a vehicle, the control circuitry is configured to control the converter circuit to charge the battery if the first power demand is less than a threshold power demand. In some example auxiliary air conditioning systems for a vehicle, the control circuitry is configured to control the battery to supply power to the compressor if the first power demand exceeds a threshold power demand.

In some example auxiliary air conditioning systems for a vehicle, the control circuitry is configured to receive a signal from a power source which provides AC power to the converter circuit indicating a power load on the power source, and the control circuitry is configured to control the amount of power supplied by the converter circuit based in part on the signal.

In some example auxiliary air conditioning systems for a vehicle, the control circuitry is configured to send a signal to a power source which provides AC power to the converter to turn on the power source when the first power demand is detected.

Disclosed example power supplies for an auxiliary air conditioning system for a vehicle include: a converter circuit configured to convert received AC power to DC power to drive a compressor of the auxiliary air conditioning system; and control circuitry configured to: determine a first power demand from the auxiliary air conditioning system; determine a total power load on a power source which provides the AC power; and control an amount of power supplied by the converter circuit based on the first power demand and the total power load.

In some example power supplies for an auxiliary air conditioning system for a vehicle, the control circuitry is configured to control the converter circuit to convert AC power from the generator to charge the battery.

In some example power supplies for an auxiliary air conditioning system for a vehicle, the control circuitry comprises communications circuitry configured to send a signal to the power source indicating the first power demand.

As used herein, "power conversion circuitry" and/or "power conversion circuits" refer to circuitry and/or electrical components that convert electrical power from one or more first forms (e.g., power output by a generator) to one or more second forms having any combination of voltage, current, frequency, and/or response characteristics. The power conversion circuitry may include safety circuitry, output selection circuitry, measurement and/or control circuitry, and/or any other circuits to provide appropriate features.

As used herein, the terms "first" and "second" may be used to enumerate different components or elements of the same type, and do not necessarily imply any particular order. For example, while in some examples a first compartment is located prior to a second compartment in an airflow path, the terms "first compartment" and "second compartment" do not imply any specific order in which air flows through the compartments.

The term "welding-type system," as used herein, includes any device capable of supplying power suitable for welding, plasma cutting, induction heating, CAC-A and/or hot wire welding/preheating (including laser welding and laser cladding), including inverters, converters, choppers, resonant power supplies, quasi-resonant power supplies, etc., as well as control circuitry and other ancillary circuitry associated therewith.

As used herein, the term "welding-type power" refers to power suitable for welding, plasma cutting, induction heating, CAC-A and/or hot wire welding/preheating (including laser welding and laser cladding). As used herein, the term "welding-type power supply" and/or "power supply" refers to any device capable of, when power is applied thereto, supplying welding, plasma cutting, induction heating, CAC-A and/or hot wire welding/preheating (including laser welding and laser cladding) power, including but not limited to inverters, converters, resonant power supplies, quasi-resonant power supplies, and the like, as well as control circuitry and other ancillary circuitry associated therewith.

As utilized herein the terms "circuits" and "circuitry" refer to physical electronic components, any analog and/or digital components, power and/or control elements, such as a microprocessor or digital signal processor (DSP), or the like, including discrete and/or integrated components, or portions and/or combination thereof (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code.

The terms "control circuit," "control circuitry," and/or "controller," as used herein, may include digital and/or analog circuitry, discrete and/or integrated circuitry, microprocessors, digital signal processors (DSPs), and/or other logic circuitry, and/or associated software, hardware, and/or firmware. Control circuits or control circuitry may include memory and a processor to execute instruction stored in memory. Control circuits or control circuitry may be located on one or more circuit boards that form part or all of a controller, and are used to control a welding process, a device such as a power source or wire feeder, and/or any other type of welding-related system.

As used, herein, the term "memory" and/or "memory device" means computer hardware or circuitry to store information for use by a processor and/or other digital device. The memory and/or memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), flash memory, solid state storage, a computer-readable medium, or the like.

As used herein, the term "torch," "welding torch," "welding tool" or "welding-type tool" refers to a device configured to be manipulated to perform a welding-related task, and can include a hand-held welding torch, robotic welding torch, gun, or other device used to create the welding arc.

As used herein, the term "welding mode," "welding process," "welding-type process" or "welding operation" refers to the type of process or output used, such as current-controlled (CC), voltage-controlled (CV), pulsed, gas metal arc welding (GMAW), flux-cored arc welding (FLAW), gas tungsten arc welding (GTAW), shielded metal arc welding (SMAW), spray, short circuit, and/or any other type of welding process.

FIG. 1 is a diagrammatical overview of a work vehicle 10 in which a service pack 12 is installed. The work vehicle 10 is shown as a work truck, although any suitable configuration of vehicle may be employed. The work vehicle 10 has a cab 14, which is cooled by an air conditioning system 16 of the work vehicle 10. The work cab 14 is heated by a heating system 17. The work vehicle 10 has an engine 18 which powers the work vehicle 10, and also powers the air conditioning compressor 20 of the air conditioning system 16 of the work vehicle 10. The engine 18 also powers the heating system 17. The air conditioning system 16 of the work vehicle 10 includes the primary air conditioning compressor 20 and a refrigeration (or coolant) loop 22, which includes conduits, a condenser, an expansion valve, and an evaporator. Control circuitry 24 of the work vehicle 10 controls the operation of the air conditioning system 16 of the work vehicle 10, including the engine 18 and the primary compressor 20. Cooled air from the air conditioning system 16 is delivered to the cab 14 of the work vehicle 10 via a blower fan 25 and vents 26 in the cab 14. The control circuitry 24 also controls the operation of the heating system 17. The control circuitry 24 includes processing circuitry, memory, and communications circuitry.

A user interface 28 may allow a user to control the temperature in the cab 14. The user interface 28 may include sensors which sense the temperature inside the cab 14. The user interface 28 communicates with the control circuitry 24 to control the air conditioning system 16 or the heating system 17 of the work vehicle 10 to cool or heat the cab 14 to the set or desired temperature. The control circuitry 24 also controls various other functions of the work vehicle 10, including monitoring the charge of the battery 30 and charging the battery 30 from the engine 18. In some examples, the control circuitry 24 includes a dedicated cooling control system which receives control inputs from the user interface 28 and controls the air conditioning system 16 to cool the cab 14 based on the inputs. In some examples, the control circuitry 24 includes a dedicated heating control system which receives control inputs from the user interface 28 and controls the heating system 17 to heat the cab 14 based on the inputs.

In the example of FIG. 1, a service pack 12 is installed on the truck 10. The service pack 12 includes a service engine 32. The service engine 32 drives a generator 34. The service engine 32 is a source of mechanical power, and the generator 34 utilizes that power to provide outputs in the form of alternating current electrical power. The mechanical power of the engine 32 is transferred to the generator 34 via a belt or other interface.

The generator 34 may provide power to various loads, which connect to the service pack 12 at receptacles/outputs 38, 63, and 65 of the service pack 12. For example, a portable welder 54 (e.g., weld circuitry configured to convert power from the generator 34 to welding-type power) that provides current-controlled and/or voltage-controlled power suitable for a welding application receives power from the service pack 12. The welder 54 may receive power from the electrical output of the generator 34 via receptacle(s) 38 and contains circuitry configured to provide for appropriate regulation of the output power provided to cables suitable for a welding application 56. The welder 54 may be any type of welding-type device, including a welder, a plasma cutter, and/or an induction heating device, which may operate in accordance with any one of many conventional welding techniques, such as stick welding, tungsten inert gas (TIG) welding, metal inert gas (MIG) welding, and so forth. Although not illustrated in FIG. 1, certain of these welding techniques may call for or conveniently use wire feeders to supply a continuously fed wire electrode, as well as shielding gasses and other shielding supplies. Such wire feeders may be coupled to the service pack 12 and powered by the service pack 12, where desired. In some examples, a welder, for example welder 54, may be included within the service pack 12. In some examples a welder may be included within the service pack and an additional portable welder 54 may receive power via the receptacle 38.

Auxiliary loads may also be coupled to the receptacle(s) 38 and receive power from the service pack 12. Auxiliary loads may include lights 58, or any other loads that would otherwise be powered by operation of the work vehicle engine 18. The receptacle 38 may also be connected to the work vehicle battery 30 to provide battery charging and/or jump-starting the work vehicle 10 via a battery charger (not shown). The receptacle 38 may be connected to the battery 30 via a path that is internal to the body of the work vehicle 10 and/or via an external path (e.g., an extension cable connected to a jump start connector.) In some examples, as shown, the work vehicle battery 30 is connected to the generator 34 via a battery charger.

The service engine 32 may also drive an air compressor and/or a pump (not shown). The air compressor may provide compressed air via a hose 62 to a tool, such as an impact wrench 60. The hose 62 may connect to an output 63 of the service pack 12. Similarly, a hydraulic load, illustrated in the form of a reciprocating hydraulic cylinder 64, may be coupled to the service pack 12 via appropriate hoses or conduits 66. The hoses or conduits 66 may connect to the service pack 12 at output 65. Certain of these applications, for example, the hydraulic applications, may call for the use of additional valves, particularly for directional control and load holding. Such valves may be incorporated into the work vehicle 10 and/or may be provided separately either in the application itself or intermediately between the service pack and the hydraulic actuators. One or more of the applications illustrated diagrammatically in FIG. 1 may be incorporated into the work vehicle 10 itself. For example, the work vehicle 10 may be designed to include a man lift, scissor lift, hydraulic tailgate, or any other driven systems which can be coupled to the service pack and driven separately from the main vehicle engine.

The service pack 12 may be physically positioned at any suitable location in the work vehicle 10. In a presently contemplated example, the service engine 32 may be mounted on, beneath or beside the vehicle bed or work platform rear of the vehicle cab. In some work vehicles, for example, the vehicle chassis may provide convenient mechanical support for the engine and certain of the other components of the service pack. For example, steel tubing, rails or other support structures extending between the front and rear axles of the vehicle may serve as a support for the service engine 32.

The work vehicle 10 also includes an auxiliary air conditioner and/or heating system 110 and an auxiliary air conditioner power supply 120. For convenience, the auxiliary air conditioner and/or heating system 110 will be referred to as the "air conditioner 110," but the air conditioner 110 may include air conditioning and/or heating components. In some examples, the auxiliary air conditioner 110 runs on direct current ("DC") power. In some examples, the auxiliary air conditioner 110 may run on 12 Volt, 24 Volt, 36 Volt, 48 Volt, or 57 Volt DC input power. The auxiliary air conditioner 110 includes an auxiliary compressor 112 and a controller 114. The auxiliary compressor 112 may be connected to the refrigeration loop 22. Accordingly, the compressor 112 can drive the refrigeration loop 22 of the work vehicle 10 with minimal duplication of system components. The auxiliary compressor 112 is connected to the refrigeration loop 22 via conduits 41, such as through a coupling and/or valve system 42. Similarly, the primary compressor 20 is connected to the refrigeration loop 22 via a coupling and/or valve system 44.

In some examples, the auxiliary air conditioner 110 may also include a heating unit 113. The heating unit 113 may be, for example, a resistive heating component. The heating component may be connected to the vents 26 of the cab 14 to minimize duplication of components.

The control circuitry 24 of the work vehicle 10 communicates with the controller 114 of the auxiliary air conditioner 110. The controller 114 includes a processor, memory, and communications circuitry which facilitates communication with the controller 24 of the work vehicle 10 and the user interface 28. The controller 24 may communicate to the controller 114 that the engine 18 of the work vehicle 10 is off. The controller 24 may also route cooling or heating settings from the user interface 28 to the controller 114. Accordingly, the controller 114 may control the compressor 112 to operate to cool the cab 14 or the heating unit 113 to operate to heat the cab to a setting set at the user interface 28.

In some examples, one or more of valves 42 and 44 are controllable. When the engine 18 of the work vehicle 10 is running, for example, controller 24 closes the valve 42 and opens the valve 44, such that the engine 18 drives the primary compressor 20, and refrigerant flows through the refrigeration loop 22 and the primary compressor 20 and thereby cools the cab 14. When the engine 18 of the work vehicle 10 is off, then the controller 24 closes the valve 44 and opens the valve 42. Accordingly, the auxiliary compressor 112 pumps refrigerant through the refrigeration loop 22 and thereby cools the cab 14. In some examples, valves 42 and 44 are controlled by the controller 114 of auxiliary air conditioner 110.

The power supply 120 includes power conversion circuitry 122 which converts received AC power to power suitable to power the auxiliary air conditioner 110. For example, the power conversion circuitry may convert the received AC power to DC power (e.g., 12 Volt, 24 Volt, 36 Volt, 48 Volt, or 57 Volt DC power.) The power supply 120 also includes a battery 124 and a controller 126. The controller 126 includes a processor, memory, and communication circuitry which facilitates communication with the controller 40 of the service pack and/or the controller 114 of the auxiliary air conditioner 110. The controller 126 determines the power demand from the auxiliary air conditioner 110, for example based on a signal received from the controller 114, and controls the power conversion circuitry 122 to convert power received from the generator 34 based on the determined power demand.

As described above, the service engine 32 may drive various loads in addition to the auxiliary air conditioner 110. Accordingly, in some examples, the controller 40 sends a signal to the controller 126 indicating the amount of power available to the power supply 120 from the generator 34 based on the power demanded from the other loads on the service engine 32. In some examples, the controller 40 is configured to manage the power provided to the various loads to prevent an overload on the service engine 32.

In some examples, the controller 40 manages the loads based on a load priority scheme (e.g., welding and/or cutting may be the first priority load, hydraulics and/or air compression may be second priority, charging the work vehicle battery 30 may be the third priority, auxiliary output the fourth priority, and cooling the fifth priority). In some examples, cooling is a lower priority than other loads on the service engine 32, and therefore the controller 40 may control the generator 34 to limit the amount of power provided from the generator 34 to the power supply 120 based on the load priority scheme. The controller 40 may also indicate (e.g., transmit a signal indicating) to the controller 126 of the power supply 120 the amount of power (e.g., the instantaneous amount of power) that the generator is able to provide to the power supply.

In some examples, the controller 40 may monitor the service engine 32 speed. In some examples, the controller 40 enables the generator 34 to output power to the power supply 120 when the speed of the engine 32 is below a threshold. In some examples, the controller 40 controls the amount of power provided by the generator 34 to the power supply 120 based on the speed of the engine 32.

In some examples, the controller 40 may monitor the power load drawn by each load (for example, the controller may determine the power, voltage and/or current drawn by each load) to determine the total load on the service engine 32. In some examples, if the total load is below a threshold, then the controller 40 enables the generator 34 to output power to the power supply 120. In some examples, the controller 40 controls the amount of power provided by the generator 34 to the power supply 120 based on the total load.

Similarly, the controller 40 may limit the power provided by the service engine 32 to any of the various loads when the overall power demand on the service engine 32 exceeds a threshold. As described above, the controller 40 may assign a priority to the various loads. The priority of the loads may be stored in memory of the controller 40, may be accessed from a remote platform, may be assigned to a unique welding sequence and/or process, may be updated based on historical data (i.e. from machine learning and/or artificial intelligence), and/or other suitable data management sources. In some examples, the priority of loads may be set and/or updated by a user, for example via a user interface (not shown) of the service pack 12. If the load demand from several of the various loads exceeds a threshold(s), the controller 40 will provide the available power to the loads in order of priority (e.g., first priority may be welding and/or cutting, second priority may be hydraulics, third priority may be the air compressor, the fourth priority may be lighting or other auxiliary loads, the fifth priority may be battery charging, the sixth priority may providing power to the power supply 120 to cool the cab 14). Accordingly, when the power demand on the service engine 32 exceeds a threshold, the controller may choke or cut off power to the lower priority loads, for example via opening switches connecting the loads to power or disengaging a clutch. If the service engine 32 is operating below its load threshold, the controller 40 may increase the service engine 32 speed to create more power in response to an increase in load power demand.

Loads on the service engine 32 may vary widely throughout the day, and therefore cooling or heating the cab 14 in between other loads on the service engine 32 is an efficient way to achieve temperature control of the cab 14 without impacting the other loads or using an oversized engine.

In some examples, the controller 126 of the power supply 120 may send a signal to the controller 40 of the service pack 12 to turn on the engine 32 and generator 34 if the engine 32 and the generator 34 are not running when the power supply 120 determines that the auxiliary air conditioner 110 requires power. In response to receiving the signal from the controller 126 of the power supply 120, the controller 40 of the service pack turns on the engine 32 and the generator 34. The generator 34 then provides power to the power supply 120.

The controller 126 may also determine a charge level of the power supply battery 124, for example by comparing the voltage level of the battery 124 to an expected battery voltage. If the battery voltage is less than the expected battery voltage by a threshold amount, the controller 126 may control the power conversion circuitry 122 to charge the battery 124.

In some examples, the controller 126 controls the power conversion circuitry 122 to charge the battery 124 when the amount of power available from the generator 34 is greater than the amount of power demanded from the auxiliary air conditioner 110. In some examples, if the controller 126 determines that the amount of power available from the generator 34 is less than the power demand from the auxiliary air conditioner 110, then the controller 126 controls the battery 124 to provide the additional required power to drive the auxiliary air conditioner 110. For example, the controller 126 may close a switch allowing the auxiliary air conditioner 110 to draw power from the battery. In some examples, if the controller 126 determines that the battery 124 has a voltage below a threshold voltage, and the power demand from the auxiliary air conditioner 110 is greater than the power available from the generator, then the controller 126 controls the power conversion circuitry 122 to provide the power available to the auxiliary air conditioner 110. Accordingly, when the power demand from the auxiliary air conditioner 110 is greater than the power available from the generator and the battery 124 is depleted, the auxiliary air conditioner 110 may operate at a low power level. In some examples, the power supply 120 may not include a battery, and the controller 126 controls the power conversion circuitry 122 to power the auxiliary air conditioner 110. In such examples, when the power demand from the auxiliary air conditioner 110 is greater than the power available from the generator and the battery 124 is depleted, the auxiliary air conditioner 110 may operate at a low power level.

In some examples, the auxiliary air conditioner 110 is driven by the battery 124 rather than the power conversion circuitry 122. The controller 126 monitors the voltage of the battery 124 to and controls the power conversion circuitry 122 to charge the battery 124 when the voltage of the battery 124 drops below a threshold level. The controller 126 controls the power conversion circuitry 122 to charge the battery when a signal from the controller 40 indicates that the generator 34 is able to provide power to the power supply 120.

When the engine 18 is turned off, the user interface 28 and blower fan 25 are powered by the work vehicle battery 30. Accordingly, the service pack 12 is configured to change the battery 30 of the work vehicle 10 during operation of the auxiliary air conditioner 110. In some examples, the blower fan 25 may also be powered via the auxiliary air conditioner power supply 120. Some auxiliary air conditioning systems 110 may include a second blower fan which is powered by the power supply 120. Some auxiliary air conditioning systems 110 may also include an auxiliary condenser fan configured to blow air across the condenser coils of the refrigeration loop during operation of the air conditioner 110. The auxiliary condenser fan may be powered by the power supply 120 or the battery 30 of the work vehicle 10.

Although described as receiving power from the generator 34 of a service pack 12, an auxiliary air conditioner power supply 120 may convert AC power from any AC power source (e.g., any power source which provides 120 or 240 Volt AC power) to drive an auxiliary air conditioner 110. For example, the auxiliary air conditioner power supply 120 may receive power from the AC power grid or an engine/generator set which is not mounted onto the work vehicle 10.

Figure 2:
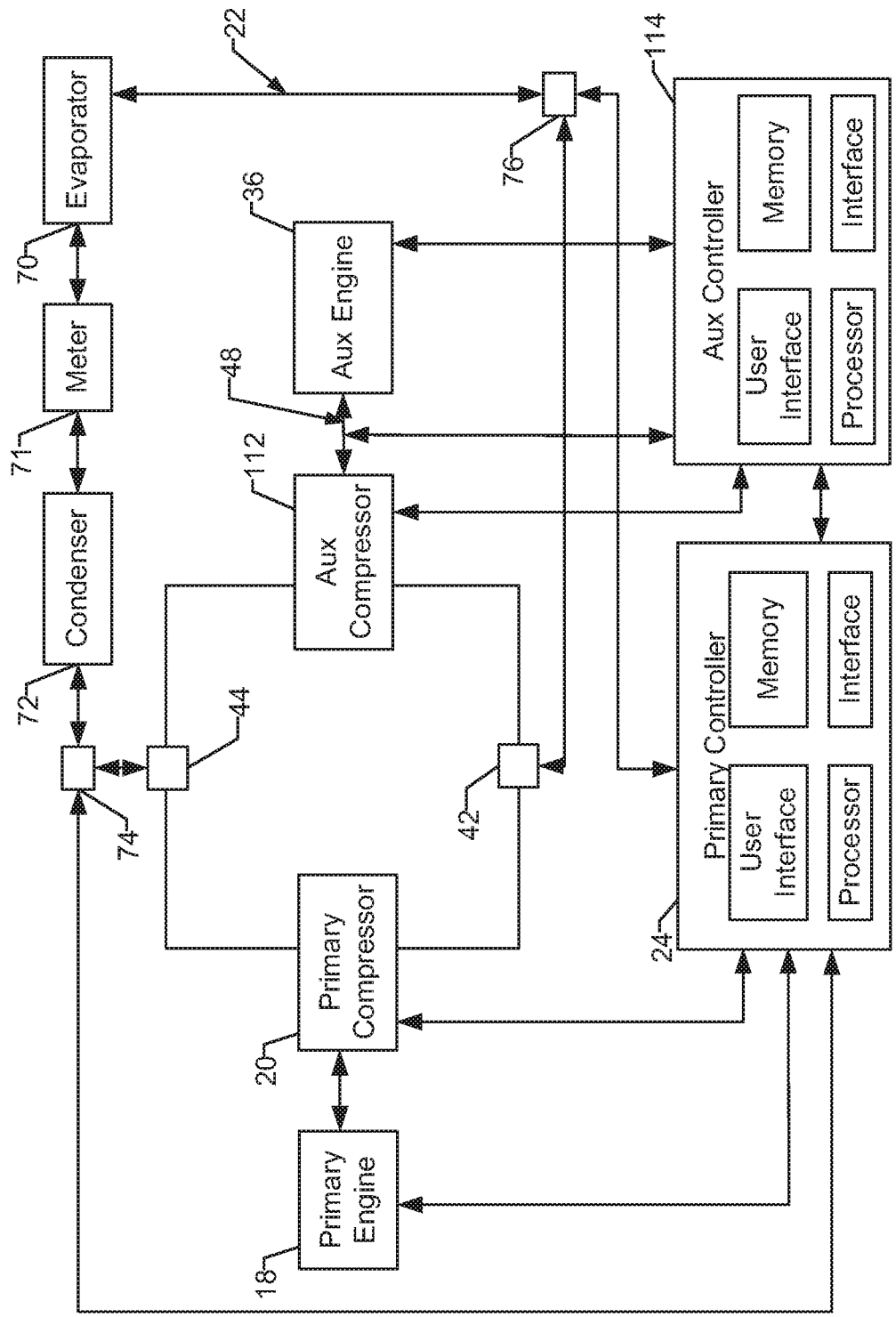
FIG. 2 is a diagrammatic overview of an air conditioning system, in accordance with aspects of this disclosure.

FIG. 2 illustrates a close up view of the components of the air conditioning system 16 of the work vehicle and the air conditioning components of the service pack 12. Where common features are shown, reference numerals from FIG. 1 are used to indicate like features. As shown, the refrigeration loop 22 connects evaporator 70 with condenser 72. The primary compressor 20 and the auxiliary compressor 32 connect to the refrigeration loop 22 via valves 42, 44. The primary controller 24 (or alternatively the auxiliary controller 40) is configured to control valves 42, 44 to open and/or close based on which compressor is in use. Alternatively, valves 42, 44 serve as a connection point for the refrigeration loop 22 and check valves in the primary compressor 20 and the auxiliary compressor 112 to govern compressor operation.

Additionally or alternatively, one or more high and low pressure switches 74, 76 are also included. The switches 74, 76 monitor the pressure within the refrigerant loop 22, and can provide information to the controller 24 and/or controller 114. In this manner, the signals from the switches can be compared against one or more threshold pressure values, which can be used to trigger operation of compressors 20, 112. The threshold pressure values can be stored in memory and compared via a processor in either controller, according to various examples. In some examples, during operation of the air conditioning system, when the measured pressure drops below a first threshold pressure value, the controller(s) activate the compressor(s). This can be done by controlling a clutch (e.g. clutch 48) to turn the compressor(s) from power supplied by the power supply 120. In an example where the measured pressure exceeds a second threshold pressure value, the controller(s) can control the compressors to deactivate, such as by disengaging the clutch.

Although the auxiliary compressor 112 is described with respect to an auxiliary air conditioner 110 associated with a work vehicle, in some examples the auxiliary air conditioner 110 is configured to provide cooling to a variety of environments. For example, the primary engine and primary compressor can be part of a system to provide power, air, etc., such as a portable system for emergency response, cooling of temporary structures, or other such purposes.

Figure 3:
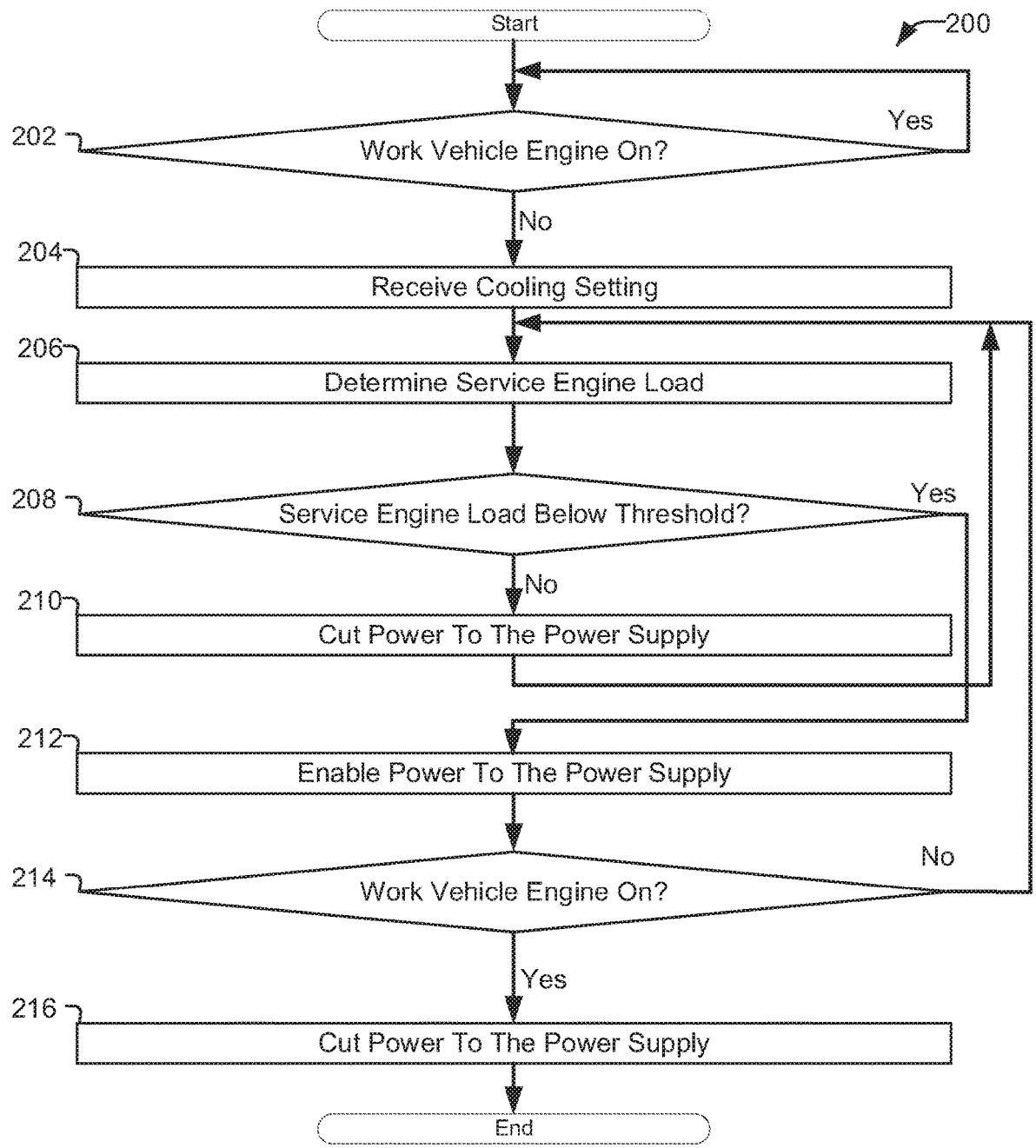
FIG. 3 is a flow chart representative of an example method of cooling a cab of a work vehicle via a service engine and an auxiliary air conditioner which shares a refrigeration loop with a primary air conditioning compressor of the work vehicle, in accordance with aspects of this disclosure.

FIG. 3 is an example method 200 of monitoring loads on a service engine and cooling the cab of a work vehicle. Although described as a method of cooling the cab, the method may also be used to heat the cab where the auxiliary air conditioner includes a heating component. The example method 200 may be implemented, for example, in the work vehicle 10 and/or service pack 12 of FIG. 1.

At block 202, the controller 40 of the service pack 12 determines whether the engine 18 of the work vehicle 10 is off. In some examples, the controller 40 may receive a signal from the communication system (e.g., wireless system or CAN bus) of the work vehicle 10 indicating that the engine 18 is off. In some examples, the controller 40 may have a wired connection to control circuitry 24 of the work vehicle 10. If the engine 18 is on (block 202), then the controller 40 continues to monitor whether the engine 18 is off.

If the engine 18 is off (202), then at block 204 the controller 40 receives a signal from a user interface indicating a desired cooling setting of the cab 14. In some examples, the cooling setting may be a set temperature. In some examples, the cooling setting may be an analog low-medium-high setting. In some examples, the auxiliary air conditioner controller 114 receives the signal indicating the desired temperature from the user interface 28 and forwards the signal to the controller 40. If the work vehicle engine is off (block 202), the controller 40 (or one of the controllers 24 or 114) may also open valve 42 and close valve 44 such that the auxiliary compressor 112 may pump refrigerant through the refrigeration loop 22.

At block 206, the controller 40 determines the load on the service engine 32. As described above with reference to FIG. 1, the service engine 32 may drive various loads, including a welder 54, an air compressor (and associated tools 60), hydraulics 64, auxiliary loads 58, battery 30 charging, etc. In some examples, the controller 40 may determine the total load on the service engine 32 by determining the power demand from each load (for example, by measuring the voltage and/or current drawn at each load output) and adding the various power demands. In some examples, the controller 40 may estimate the service engine 32 load by measuring the speed of the service engine 32.

At block 208, the controller 40 compares the service engine load determined at block 206 to one or more thresholds. If the determined load is above a particular threshold (block 208), then at block 210 the controller 40 controls the generator 34 to disable power (or limit) power to the power supply 120. For example, the controller 40 may control a switch which closes to provide power from the generator 34 to the power supply 120 and opens to cut power from the generator 34 to the power supply 120. In some examples, the controller 40 may control a circuit which limits the amount of power provided from the generator 34 to the power supply 120. After block 210, the controller 40 then returns to block 206 and continues to monitor the load on the service engine 32. If the determined load is below a threshold (block 208) then at block 212 the controller 40 causes the generator 34 to provide power to the power supply 120.

At block 214, the controller 40 again checks if the work vehicle engine 18 is on. If the work vehicle engine 18 is not on, then the controller 40 returns to block 206 to determine the service engine 32 load. If the work vehicle engine 18 is on (block 214), then at block 216 the controller 40 controls generator to disable power to the power supply 120. When work vehicle engine 18 is on, the work vehicle engine 18 drives the primary air conditioning compressor 20 to cool the cab. Accordingly, when the work vehicle engine is on, the controller 40 (or the controllers 24 or 114) may also control the valve 42 to close and valve 44 to open so that the primary compressor 20 may pump refrigerant through the refrigeration loop 22.

Figure 4:
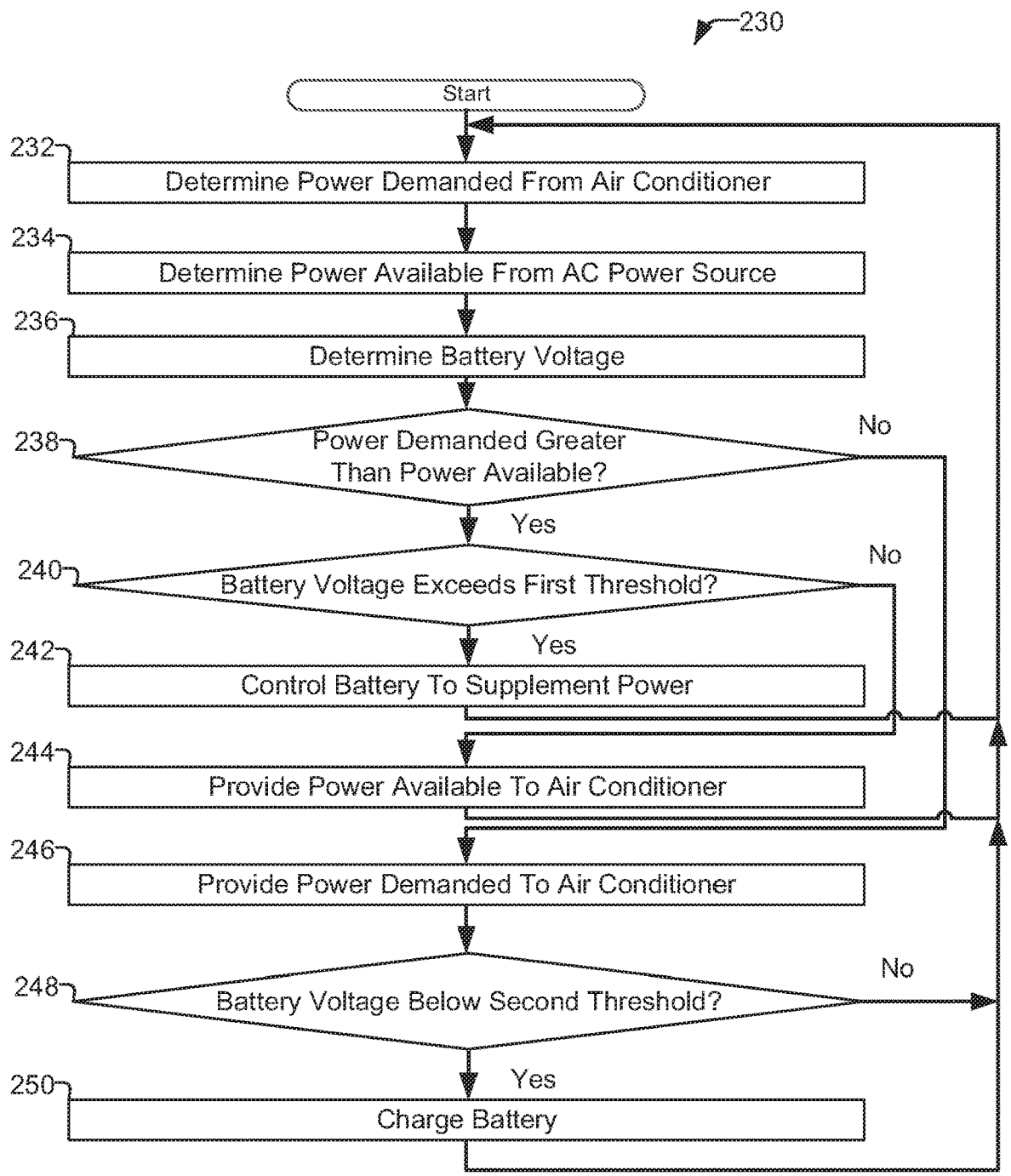
FIG. 4 is a flow chart representative of another example method of controlling cooling of a cab in a work vehicle in which power conversion circuitry converts AC power to DC power to drive an auxiliary air conditioner, in accordance with aspects of this disclosure.

FIG. 4 is another example method 230, which can be executed to control the provision of power to an auxiliary air conditioner (e.g., to cool or heat a cab of a vehicle). The example method 230 may be implemented, for example, in the work vehicle 10 and/or the auxiliary air conditioner power supply 120, auxiliary air conditioner 110, and/or service pack 12 of FIG. 1.

At block 232, the controller 126 determines the power demanded from the auxiliary air conditioner 230. In some examples, the controller 114 of the auxiliary air conditioner 110 may determine the power required based on a desired temperature set by an operator at the user interface 28. The controller 114 of the auxiliary air conditioner 110 may send a signal to the controller 126 of the power supply 120 indicating the power demand to drive the auxiliary air conditioner 110 to cool the cab 14 to the desired temperature.

At block 234, the controller 126 determines the power available from the service pack 12 (or other source of AC power). As described above, the controller 40 of the service pack 12 may determine an amount of power available to the power supply 120 based on the total power load on the service engine 32 and a load priority scheme. The controller 40 of the service pack 12 may send a signal to the controller 126 of the power supply 120 indicating the amount of power that the generator 34 may provide to the power supply 120. Generally if the AC power source is the AC power grid, the AC power grid is able to provide to the power supply 120 the maximum amount of power required to drive the auxiliary air conditioner 110.

At block 236, the controller 126 determines the voltage of the battery 124. For example, a voltmeter connected to the battery 124 may send a signal indicating the battery voltage to the controller 126.

At block 238, the controller compares the determined amount of power demanded by the auxiliary air conditioner 110 (block 232) to the amount of power available from the AC power source (block 234). If the amount of power available is less than the amount of power demanded (block 238), then at block 240 the controller 126 compares the battery voltage determined at block 236 to a first threshold voltage. If the battery voltage exceeds the first threshold (block 240), then at block 242, the controller 126 controls the battery to supplement the power provided by the generator 34. The controller 126 then returns to block 232 and continues to monitor the power demand, power available, and battery voltage.

If the battery voltage does not exceed the first threshold (block 240), then at block 244, the controller 126 commands the power conversion circuitry 122 to convert the available power from the generator 34 to DC power to drive the auxiliary air conditioner 110. The controller 126 then returns to block 232 and continues to monitor the power demand, power available, and battery voltage. At block 244, the power supply 120 provides less power to the auxiliary air conditioner 110 than is demanded by the auxiliary air conditioner 110 to cool the cab to the desired temperature, and therefore the auxiliary air conditioner may be unable to cool the cab 14 to the desired temperature until the available power is increased.

If the power demanded does not exceed the power available (block 238), then at block 246 the controller 126 controls the power conversion circuitry 122 to provide the amount of power demanded by the auxiliary air conditioner 110 to the auxiliary air conditioner 110. At block 248, the controller 126 determines whether the battery voltage (determined at block 236) is below a second threshold voltage. If the battery voltage is below the second threshold (block 248), then at block 250 the controller 126 controls the power conversion circuitry 122 to convert excess power available from the generator 34 to charge the battery 124. The controller 126 then returns to block 232 and continues to monitor the power demand, power available, and battery voltage. If the controller 126 determines that the battery voltage exceeds the second threshold (block 248), then the controller 126 determines that the battery 124 is charged and does not require additional charge. Accordingly, the controller 126 then returns to block 232 and continues to monitor the power demand, power available, and battery voltage.

Figure 5:
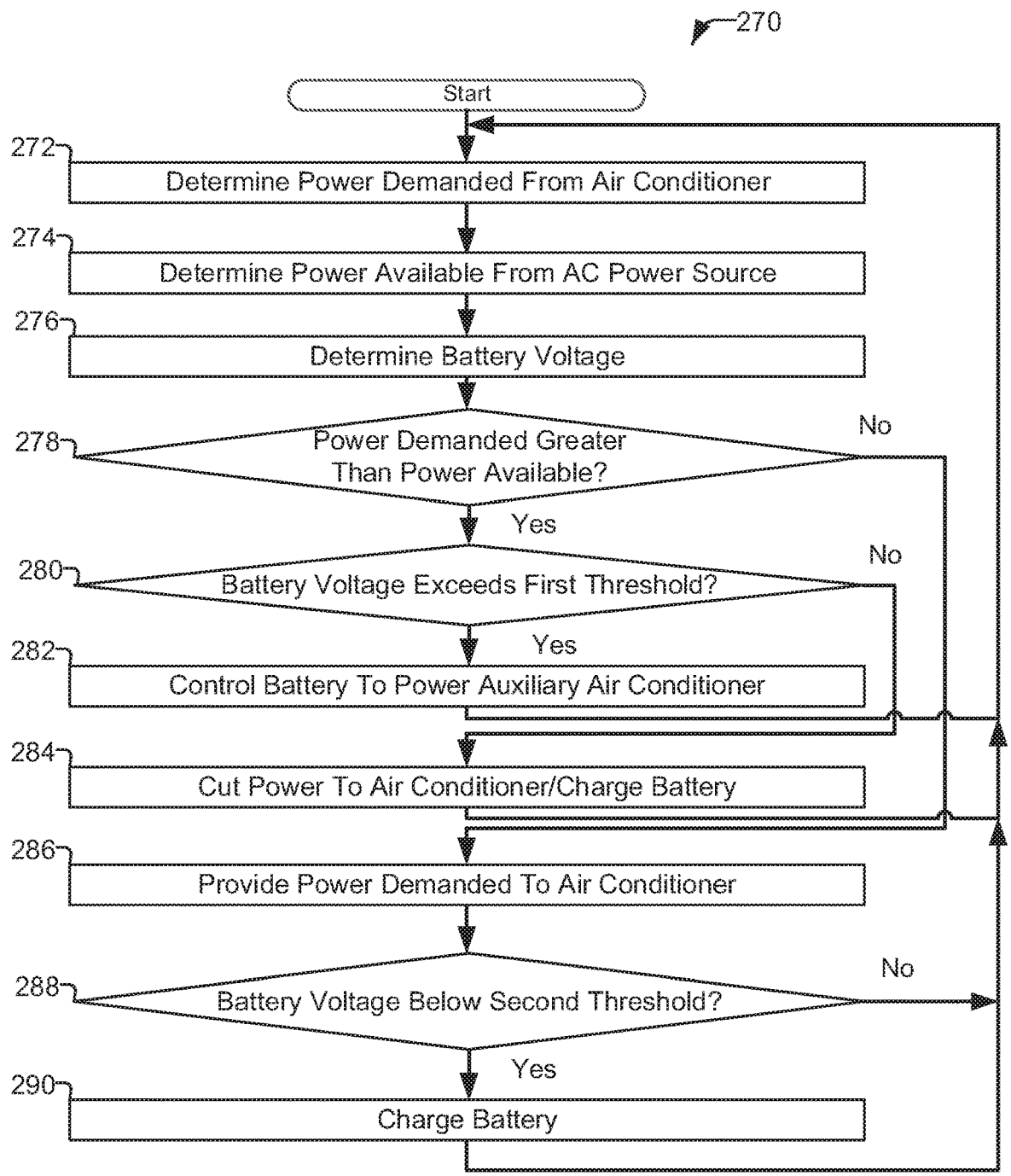
FIG. 5 is a flow chart representative of another example method of controlling cooling of a cab in a work vehicle in which a battery provides power to drive an auxiliary air conditioner, in accordance with aspects of this disclosure.

FIG. 5 is another example method 270, which can be executed to control the provision of power to an auxiliary air conditioner (e.g., to cool or heat a cab of a vehicle). The example method 230 may be implemented, for example, in the work vehicle 10 and/or the auxiliary air conditioner power supply 120, auxiliary air conditioner 110, and/or service pack 12 of FIG. 1. In the example method 270, the battery 124 of the power supply 120 is configured to provide power to the auxiliary air conditioner 110.

At block 272, the controller 126 determines the power demanded from the auxiliary air conditioner 230. At block 274, the controller 126 determines the power available from the service pack 12 (or other source of AC power). At block 276, the controller 126 determines the voltage of the battery 124.

At block 278, the controller compares the determined amount of power demanded by the auxiliary air conditioner 110 (block 272) to the amount of power available from the AC power source (block 274). If the amount of power available is less than the amount of power demanded (block 278), then at block 280 the controller 126 compares the battery voltage determined at block 276 to a first threshold voltage. If the battery voltage exceeds the first threshold (block 280), then at block 282, the controller 126 controls the battery provide the power demanded to the auxiliary air conditioner 110. The controller 126 then returns to block 272 and continues to monitor the power demand, power available, and battery voltage.

If the battery voltage does not exceed the first threshold (block 280), then at block 284, the controller 126 cuts power to the auxiliary air conditioner 110 and controls the power conversion circuitry 122 to convert the available power from the generator 34 to charge the battery 124. The controller 126 then returns to block 272 and continues to monitor the power demand, power available, and battery voltage.

If the power demanded does not exceed the power available (block 278), then at block 286 the controller 126 controls the battery 124 to provide the amount of power demanded by the auxiliary air conditioner 110 to the auxiliary air conditioner 110. At block 288, the controller 126 determines whether the battery voltage (determined at block 276) is below a second threshold. If the battery voltage is below the second threshold (block 288), then at block 290 the controller 126 controls the power conversion circuitry 122 to convert power available from the generator 34 to charge the battery 124. The controller 126 then returns to block 272 and continues to monitor the power demand, power available, and battery voltage. If the controller 126 determines that the battery voltage exceeds the second threshold (block 248), then the controller 126 determines that the battery 124 is charged and does not require additional charge. Accordingly, the controller 126 then returns to block 272 and continues to monitor the power demand, power available, and battery voltage.

FIG. 5 is another example method 270, which can be executed to control the provision of power to an auxiliary air conditioner. The example method 230 may be implemented, for example, in the work vehicle 10 and/or the auxiliary air conditioner power supply 120, auxiliary air conditioner 110, and/or service pack 12 of FIG. 1. In the example method 270, the battery 124 of the power supply 120 is configured to provide power to the auxiliary air conditioner 110.

At block 272, the controller 126 determines the power demanded from the auxiliary air conditioner 230. At block 274, the controller 126 determines the power available from the service pack 12 (or other source of AC power). At block 276, the controller 126 determines the voltage of the battery 124.

At block 278, the controller compares the determined amount of power demanded by the auxiliary air conditioner 110 (block 272) to the amount of power available from the AC power source (block 274). If the amount of power available is less than the amount of power demanded (block 278), then at block 280 the controller 126 compares the battery voltage determined at block 276 to a first threshold voltage. If the battery voltage exceeds the first threshold (block 280), then at block 282, the controller 126 controls the battery 124 provide the power demanded to the auxiliary air conditioner 110. The controller 126 then returns to block 272 and continues to monitor the power demand, power available, and battery voltage.

If the battery voltage does not exceed the first threshold (block 280), then at block 284, the controller 126 cuts power to the auxiliary air conditioner 110 and controls the power conversion circuitry 122 to convert the available power from the generator 34 to charge the battery 124. The controller 126 then returns to block 272 and continues to monitor the power demand, power available, and battery voltage.

If the power demanded does not exceed the power available (block 278), then at block 286 the controller 126 controls the battery 124 to provide the amount of power demanded by the auxiliary air conditioner 110 to the auxiliary air conditioner 110. At block 288, the controller 126 determines whether the battery voltage (determines at block 276) is below a second threshold. If the battery voltage is below the second threshold (block 288), then at block 290 the controller 126 controls the power conversion circuitry 122 to convert power available from the generator 34 to charge the battery 124. The controller 126 then returns to block 272 and continues to monitor the power demand, power available, and battery voltage. If the controller 126 determines that the battery voltage exceeds the second threshold (block 248), then the controller 126 determines that the battery 124 is charged and does not require additional charge. Accordingly, the controller 126 then returns to block 272 and continues to monitor the power demand, power available, and battery voltage.

Returning to FIG. 1, in some examples, the power supply 120 is configured to provide DC power to the auxiliary compressor 112 and/or heating unit 113 from the battery 124. The controller 126 monitors the voltage of the battery 124 and controls the power conversion circuitry 122 to charge the battery 124 when the voltage of the battery 124 is below a threshold level. In some examples, the controller 126 of the power supply 120 may send a signal to the controller 40 of the service pack 12 to turn on the engine 32 and generator 34 if the engine 32 and the generator 34 are not running when the control circuitry determines that the battery 124 requires charging. In response to receiving the signal from the controller 126 of the power supply 120, the controller 40 of the service pack turns on the engine 32 and the generator 34. The generator 34 then provides power to charge the battery 124.

As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, systems, blocks, and/or other components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. A system configured to power an auxiliary air conditioner of a vehicle, the system comprising:
    an engine mounted on the vehicle, wherein the vehicle includes a primary air conditioner driven by a vehicle engine to control a temperature of a cab of the vehicle;
    a generator mounted on the vehicle and configured to convert mechanical power produced by the engine to alternating current (AC) power;
    a converter circuit configured to convert the AC power to direct current (DC) power to power the auxiliary air conditioner to control the temperature of the environment within the cab; and
    control circuitry configured to:
        receive a signal indicating that the vehicle engine is off;
        receive a signal indicating a desired temperature for the cab;
        determine a first power demand from the auxiliary air conditioner based on a desired temperature for the cab; and
        control an amount of power supplied by the converter circuit to the auxiliary air conditioner based in part on the first power demand and the desired temperature to control the temperature of the environment within the cab.

2. The system of claim 1, further comprising a battery, and wherein the control circuitry is configured to control the converter circuit to convert AC power from the generator to charge the battery.

3. The system of claim 2, wherein the control circuitry is configured to control the converter circuit to charge the battery if the first power demand is less than a threshold power demand.

4. The system of claim 2, wherein the control circuitry is configured to control the battery to supply power to the auxiliary air conditioner if the first power demand satisfies a threshold power demand.

5. The system of claim 2, wherein the control circuitry is configured to:
    determine an amount of power available from the generator; and
    control the battery to supply power to the auxiliary air conditioner if the amount of power available from the generator is less than the first power demand.

6. The system of claim 1, wherein the generator is configured to charge a battery of the vehicle.

7. The system of claim 1, wherein the AC power is one of 120 Volts or 240 Volts.

8. A system configured to power an auxiliary air conditioner of a vehicle, the system comprising:
    a service engine mounted on the vehicle, wherein the vehicle includes a primary air conditioner driven by a vehicle engine to control a temperature of a cab of the vehicle;
    a generator mounted on the vehicle and configured to convert mechanical power produced by the service engine to electrical power; and
    control circuitry configured to:
        receive a signal indicating that the vehicle engine is off;
        receive a signal indicating a desired temperature for the cab;
        determine a power demand from the auxiliary air conditioner; and
        control an amount of the power supplied by the generator to the auxiliary air conditioner based in part on the power demand and the desired temperature to control the temperature of the environment within the cab.

9. The system of claim 8, wherein the generator is configured to charge a battery of the vehicle.

10. The system of claim 8, wherein the generator outputs the electrical power at one of 120 Volts or 240 Volts.

11. The system of claim 8, wherein the control circuitry is configured to send a signal to the generator to turn on the generator when the first power demand is detected.

12. The system of claim 8, wherein the control circuitry is further configured to:
    determine a first power demand from the auxiliary air conditioning system;
    determine a total power load on a power source which provides the electrical power; and
    control an amount of power supplied to the auxiliary air conditioner based on the first power demand and the total power load.

13. The system of claim 8, further comprising a converter circuit configured to convert the electrical power to power for the auxiliary air conditioner.

14. A system configured to power an auxiliary air conditioner of a vehicle, the system comprising:
    an engine mounted on the vehicle;
    a generator mounted on the vehicle and configured to convert mechanical power produced by the engine to electrical power;
    a converter circuit configured to convert the electrical power to power for the auxiliary air conditioner; and
    control circuitry configured to:
        receive a signal from the generator to the converter circuit indicating a power load on the generator;
        determine a power demand from the auxiliary air conditioner; and control an amount of power supplied by the converter circuit based in part on the signal and the power demand.

15. The system of claim 13, wherein the control circuitry is further configured to:
determine a first power demand based on a temperature setting for the vehicle; and
control an amount of power supplied by the converter circuit to the compressor based on the first power demand.

16. The system of claim 13, further comprising a battery, and wherein the control circuitry is configured to control the converter circuit to charge the battery.

17. The system of claim 16, wherein the control circuitry is configured to control the converter circuit to charge the battery if the first power demand is less than a threshold power demand.

18. The system of claim 17, wherein the control circuitry is configured to control the battery to supply power to the compressor if the first power demand exceeds a threshold power demand.

19. The system of claim 13, further comprising a battery, and wherein the control circuitry is configured to control the converter circuit to convert AC power to DC power from the generator to charge the battery.

* * * * *